United States Patent Office 3,400,086
Patented Sept. 3, 1968

3,400,086
RUBBER BLEND
Robert James Orr, Sarnia, Ontario, Canada, assignor to Polymer Corporation Limited, Sarnia, Ontario, Canada, a body corporate and politic
No Drawing. Filed Oct. 18, 1965, Ser. No. 497,517
Claims priority, application Canada, June 21, 1965, 933,822
3 Claims. (Cl. 260—5)

ABSTRACT OF THE DISCLOSURE

Improved gum or lightly filled vulcanizate, suitable for the production of elastic thread, is prepared from a blend of a major proportion of a copolymer of isoprene and acrylonitrile with a minor proportion of a hydrocarbon rubber such as natural rubber or cis-1,4 polybutadiene.

---

This invention relates to rubber compositions. In particular, it relates to rubber compositions containing blends of rubbery hydrocarbon polymers with copolymers of a mixture comprising a 2-alkyl butadiene-1,3 and a non-ionizable polar comonomer.

It has been recently established that a rubbery copolymer of a 2-alkyl butadiene-1,3 and a non-ionizable polar comonomer such as acrylonitrile can be compounded in the absence of reinforcing agents and vulcanized to produce an elastic material having a high tensile strength and rubber-like extensibility. The above copolymer is different from rubbery polymers of aliphatic conjugated diolefinic hydrocarbons such as produced in emulsion polymerization systems in that it is suitable for the production of gum and light-coloured rubber articles in which natural rubber has hitherto been used. In contrast to natural rubber, the copolymer of 2-alkyl butadiene-1,3 and non-ionizable polar comonomer is relatively stable to ageing and oil resistant. However, its utility is seriously limited as the temperature range in which the copolymer shows useful rubber-like properties is very narrow. At a temperature below 0° C. it loses elastomeric properties, while above the temperature of about 50° C. the strength of gum and non-reinforced filled compounds is relatively low.

The object of this invention is to widen the temperature range in which a composition containing a copolymer of 2-alkyl butadiene-1,3 and a non-ionizable polar comonomer exhibits rubber-like properties. Another object of the invention is to provide a composition comprising a blend of a copolymer of 2-alkyl butadiene-1,3 and non-ionizable polar comonomer selected from nitriles and alkyl esters of an unsaturated monocarboxylic acid and a rubber hydrocarbon polymer. And yet another object is to provide gum and non-reinforced rubber products based on a composition containing a blend of a copolymer of a 2-alkyl butadiene-1,3 and a derivative of an acrylic acid said derivative selected from nitriles and alkyl esters.

The objects of the invention have been achieved in providing a rubber composition comprising a blend of a rubbery hydrocarbon polymer and a copolymer of a mixture comprising a 2-alkyl butadiene-1,3 and a non-ionizable polar comonomer selected from nitriles and alkyl esters of an unsaturated monocarboxylic acid.

In one of the specific aspects the object of the invention has been achieved in providing a rubber composition comprising a blend of natural rubber and a copolymer of a mixture comprising isoprene and acrylonitrile. In another specific aspect, the object has been achieved in providing an elastic product based on a vulcanized rubber composition free of reinforcing agents comprising a blend of a minor proportion of natural rubber and a major proportion of a copolymer of isoprene and acrylonitrile, said copolymer containing between 20 and 50 mole percent of acrylonitrile.

Physical properties of the composition of this invention are surprising in view of the generally recognized incompatibility of polar copolymer such as butadiene-acrylonitrile (NBR) copolymer with a hydrocarbon rubbery polymer. For example when blended with natural rubber, NBR forms a homogeneous two-phase blend having in general the properties of the component present in the continuous phase. For this reason, a blend having about 50% or more of natural rubber in the continuous phase shows a resistance to oils which is considerably lower than what one would expect from the proportion of NBR present in the blend.

In contrast, the components of the composition according to this invention are more compatible and each contributes to the properties of the blend proportionally to the relative amount present. At least two polymeric components are used in the composition.

The first polymeric component is a copolymer prepared by polymerizing a mixture of monomers comprising 2-alkyl butadiene-1,3 and a polar comonomer selected from nitriles and alkyl esters of an unsaturated monocarboxylic acid. The alkyl substituent in the 2-alkyl butadiene-1,3 may be any alkyl radical containing 1 to 5 carbon atoms such as methyl, ethyl, propyl, butyl and amyl radicals. The representative examples of the 2-alkyl butadiene-1,3 are isoprene, 2-ethyl butadiene-1,3 2-propyl butadiene-1,3, 2-n-butyl butadiene-1,3 2-isoamyl butadiene-1,3. The 2-alkyl butadiene-1,3 may also be substituted at the third and/or fourth carbon atom, as in 2,3 dimethyl butadiene-1,3. However, it is preferred to use a butadiene-1,3 which at the second carbon atom has one alkyl substituent containing 1–2 carbon atoms and best results are obtained with isoprene. The polar comonomer is selected from ethylenically unsaturated compounds having the general formula

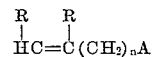

in which R is hydrogen or an alkyl radical containing 1-3 carbon atoms, $n$ is 0, 1 or 2, and A is a non-ionizable polar group such as cyanide or a carbalkoxy group of the type-COOR′ where R′ is an alkyl radical containing 1–6 carbon atoms. Representative examples of the polar comonomers are acrylonitrile, methacrylonitrile, ethacrylonitrile, allyl cyanide, methyl acrylate, ethyl acrylate, butyl acrylate, amyl acrylate, esters of methacrylic acid with methyl alcohol, ethyl alcohol, propyl alcohol and hexyl alcohol and corresponding esters of ethacrylic acid and propyl substituted acrylic acid, methyl crotonate, butyl crotonate and corresponding esters of alkyl substituted crotonic acids.

Best results are obtained with nitriles of acrylic acids and in particular with acrylonitrile. One or more polar comonomers may be copolymerized with 2-alkyl butadiene-1,3 to produce a copolymer consisting of units of two or more monomers. In addition other copolymerizable monomers such as styrene, vinyl pyridine, butadiene can also be co-polymerized in small proportions.

The proportion of the polar comonomer to the 2-alkyl butadiene-1,3 may be expressed either on a weight basis or a molar basis. The latter is preferred since the elastomeric properties of the copolymer are determined by the molar proportion. The copolymer which is preferably used contains between about 50 and 80 mole percent of the 2-alkyl butadiene and between about 50 and 20 mole percent of the polar comonomer. For best results a copolymer is used containing between 50 and 70 mole percent of the 2-alkyl butadiene and between 50 and 30 mole percent of the polar comonomer. The other copolymerizable monomers may constitute up to 30 mole percent of the copolymer, although it is preferred to use less than 20 mole percent.

The copolymer of the 2-alkyl butadiene-1,3 and the polar comonomer is produced by polymerization in the presence of conventional catalysts using conventional polymerization techniques. It is preferred to copolymerize the monomers in an aqueous emulsion system at a temperature between 0 and 70° C. A latex is obtained which is then processed in a conventional manner to produce a solid copolymer free of monomers and active catalyst residues. It is customary in the rubber industry to express the molecular weight of polymers in terms of Mooney viscosity which is determined according to ASTM D-1646-61 procedure using a large rotor and 4 minute reading at 100° C. The Mooney viscosity (ML-4 at 100° C.) of the copolymer that is used according to the invention may vary between about 10 and about 150, although it is preferred to use copolymers having a Mooney viscosity from about 20 to about 100.

The other polymeric component of the composition of this invention is a rubbery hydrocarbon polymer. The hydrocarbon polymer can be either natural rubber or a synthetic rubber such as produced by polymerizing an aliphatic conjugated alkadiene. Representative examples of the synthetic rubber are polyisoprene, polybutadiene and a styrene-butadiene copolymer. These synthetic rubbers can be prepared by polymerizing a monomer or a mixture of monomers in a conventional emulsion polymerization system. They can also be made in a solution system using an organometallic catalyst such a lithium alkyl or an aluminum alkyl compound in combination with a transition metal compound. The above solution polymerization system is capable of polymerizing conjugated alkadienes to produce polymers having a degree of structural regularity. The best known and commercially most important of these polymers are cis-1,4 polyisoprene and cis-1,4 polybutadiene. They are the preferable synthetic hydrocarbon rubbers used in this invention. However, other solution polymers of a lower stereoregularity may also be advantageously used. The rubbery hydrocarbon polymers which can be used have a Mooney viscosity (ML-4 at 100° C.) ranging between about 10 and 100 and preferably in the range of 20-70. They are preferably soluble in hydrocarbon solvents and essentially gel free.

Other polymeric materials may be blended in minor proportions if it is desired to modify the composition for use in particular products. However, it is not necessary, since the properties of the rubber composition can be controlled by suitably selecting the two components and blending them in a ratio as desired. The ratio of the components may be varied within wide limits between 10 and 90 percent by weight of the copolymer of 2-alkyl butadiene-1,3 and the non-ionizable polar comonomer and conversely, between 90 and 10 percent by weight of the rubbery hydrocarbon polymer. However, it is preferred to use blends in which the non-ionizable polar comonomer constitutes at least 10% by weight and preferably at least 15% by weight of the total polymer blend. For example, when the copolymer contains about 40% by weight of the polar comonomer units, then it can be blended with the hydrocarbon polymer in an amount of not less than 25% and preferably not less than 33% based on the weight of the blend. When, on the other hand, the copolymer contains about 20% by weight of the polar comonomer, then the blend should contain at least 50% by a weight and preferably at least 75% by weight of said copolymer. For the best balance of physical properties, however, the rubber composition of this invention contains a blend of a major proportion of the copolymer of the mixture of 2-alkyl butadiene-1,3 and the nonionizable polar monomer and a minor proportion of the rubbery hydrocarbon polymer. In the case of isoprene-acrylonitrile copolymer containing about 20 to 50 mole percent of acrylonitrile, (16 to 44 percent by weight), it is most preferable to blend about 60 to 90 weight percent of the copolymer and about 40 to 10 of the hydrocarbon polymer such as natural rubber.

The blends of the polymeric components can be prepared in a variety of ways. For example, the components may be admixed in the form of latices or solutions and then jointly recovered as a homogeneous blend. However, it is preferred to admix them in mechanical mixers such as rubber roll mills or internal Banbury mixers. After admixing in the desired ratio, the blend can be masticated, if desired, compounded and sulfur vulcanized in a conventional manner using known rubber vulcanization recipes.

The vulcanization recipes may vary widely depending on the intended use of the composition. They may be free of any fillers or may contain a minor proportion of a non-reinforcing filler, usually a lightly coloured material of mineral origin. Representative examples of such fillers are asbestos, bentonite, diatomaceous earth, dolomite, lithopone, aluminum oxide or silicate, barium sulfate, calcium silicate or carbonate, magnesium oxide or silicate, silica, titania and clays. The proportion of the filler may vary between 5 and 200 parts per 100 parts of the total polymer in the compound. The preferred amount is between 5 and 20 parts per 100 parts of the total polymer. However, if it is desired to reduce the cost of the composition in an application which does not require a high elongation, the filler may be added in an amount above 20 parts, up to about 200 parts, per 100 parts of the polymer blend. The composition of this invention shows a high tolerance for non-reinforcing fillers. Active fillers, that is, reinforcing agents such as carbon black and moderately active fillers such fine particle size silicas may also be used, although in lower proportions than the non-reinforcing fillers, since they markedly increase modulus and hardness of the rubber composition.

Other ingredients of the vulcanization recipe are plasticizers conventionally used in oil resistant rubbers such as esters of organic acids or phosphoric acid with high molecular weight alcohols, antioxidants, and agents of vulcanization consisting of sulfur, zinc oxide and an accelerator such as benzothiazyl disulfide. The components of the vulcanization system may vary within wide limits, between 0.5 and 5.0 parts and preferably about 1–2.5 parts of sulfur, between 1 and 10 parts and preferably about 2–5 parts of zinc oxide, and between 0.1 and 2.5 parts of an accelerator, all parts being based on 100 parts of the polymer blend in the composition. The compounded composition is shaped using conventional methods. It may be calendered, extruded or moulded to form slabs, sheets, rods, tubing, threads or otherwise shaped materials or articles. The shaped composition is next subjected to curing treatment which involves heating to a temperature between 100° C. and 170° C. whereby the plastic and deformable mass is transformed to an elastic state.

The cured composition of this invention has remarkable rubbery elastic properties. It may be extended to more than 5 times its original dimension. The stress at low extensions is low, but increases rapidly at about 300% elongation and above. Furthermore the composition of this invention shows good stability at an elevated temperature up to about 100° C. and good resistance to ageing at 100° C. in air or oil. Because of these properties which will be further illustrated in the specific examples, the rubber composition of the invention is suitable for use where neither natural rubber, nor the copolymer of the 2-alkyl butadiene-1,3 and the non-ionizable polar comonomer alone, nor a blend of natural rubber and a corresponding copolymer of unsubstituted butadiene-1,3 can be used. It is suitable in applications where reinforcing agents cannot be used and where the rubber composition is exposed both to elevated temperature and/or to solvents. Representative example of such application is rubber thread used in elasticized textile materials and undergarments. It must be resistant to perspiration, soap, temperature up to 100° C. such as encountered in tumble driers, and to dry cleaning fluids.

The invention is illustrated in detail in the following examples.

EXAMPLE 1

A series of three blends of an isoprene-acrylonitrile copolymer (NIR) and natural rubber (#1 Smoked Sheets) was prepared on a rubber mill equipped with two 15 cm. x 30 cm. rolls. The copolymer had been produced by polymerizing at 13° C. in aqueous emulsion a mixture of 65 parts by weight of isoprene and 35 parts by weight of acrylonitrile using a Redox catalyst system. It contained 31 percent by weight, that is, 36.5 mole percent of acrylonitrile and had a Mooney viscosity (ML-4 at 100° C.) of 62. The blends each weighing 500 gms., were milled for 10 minutes at a mill setting of about 1.5 mm. and then compounded according to the following recipe, in parts by weight:

| | |
|---|---|
| Polymer blend | 100 |
| 2,5-di-tertiary amyl hydroquinone | 1 |
| Natural barium sulfate | 5 |
| Zinc oxide | 5 |
| Stearic acid | 1 |
| Sulfur | 2.5 |
| Benzothiazyl disulfide | 1.5 |

The temperature of the polymer blends rose on milling and compounding from about 20° C. to 34° C. The compounds were press-moulded and then vulcanized at 145° C. for 50 minutes. Three test specimens were prepared from each compound. One specimen was immersed in A.S.T.M. #3 oil and maintained at 100° C. for 1 day before testing. The other specimen was placed in hot air circulating oven and aged for 5 days at 100° C., and the remaining one was tested unaged.

Physical properties of the vulcanized compounds were determined in a conventional manner as practiced in rubber industry. A control compound was also prepared from natural rubber according to the above recipe, vulcanized at 145° C. and tested in the same manner. The test results are shown in Table 1.

TABLE I

| Compound | 1 | 2 | 3 | Control |
|---|---|---|---|---|
| Proportion of NIR in the blend (percent by weight) | 80 | 60 | 40 | 0 |
| Tensile Strength (kg./cm.²): | | | | |
| Unaged | 182 | 147 | 232 | 132 |
| Aged in hot oil | 97 | 32 | 85 | 7.3 |
| Aged in hot air | 94 | 206 | 220 | 125 |
| Elongation at break (percent): | | | | |
| Unaged | 760 | 740 | 640 | 740 |
| Aged in hot oil | 685 | 570 | 550 | 360 |
| Aged in hot air | 450 | 520 | 500 | 550 |
| 300% Modulus (kg./cm.²): | | | | |
| Unaged | 14.4 | 16.5 | 18.6 | 13.3 |
| Aged in hot oil | 11.6 | 13.3 | 16.5 | 6.3 |
| Aged in hot air | 9.5 | 10.5 | 9.9 | 7.0 |
| Hardness (Shore A-2): | | | | |
| Unaged | 39 | 37 | 40 | 33 |
| Aged in hot oil | 29 | 20 | 25 | 6 |
| Flex Life (kcy./cm.), Unaged | 100 | 250 | 155 | 203 |

The above table shows that compounds 1, 2 and 3 have an improved stability to ageing both in hot oil and hot air in comparison to natural rubber.

Compound 1 was also tested for low temperature serviceability using the Gehman test. For comparison, a similar compound was prepared from the unblended NIR. The results are presented in Table II.

TABLE II

| | Compound 1 | NIR Control |
|---|---|---|
| T-10 (° C.) | −2.5 | −3.0 |
| T-100 (° C.) | −28.0 | −9.0 |
| Freeze Point (° C.) | −31.0 | −12.5 |

The above data indicate that the stiffening temperature of compound 1 is nearly 20° C. lower than that of unblended NIR.

EXAMPLE 2

Two blends were prepared from an isoprene-acrylonitrile (NIR) copolymer containing 37% by weight of acrylonitrile (43 mole percent) and having a Mooney viscosity (ML-4 at 100° C.) of 130 and #1 Smoked Sheets. They were compounded and vulcanized using the recipe and procedure of Example 1. The results of physical testing for the blends and the unblended copolymer control compound are given in Table III.

TABLE III

| Compound | 1 | 2 | Control |
|---|---|---|---|
| Proportion of NIR in the blend (percent by weight) | 60 | 80 | 100 |
| Tensile Strength (kg./cm.²): | | | |
| 35 minutes cure | 314 | 244 | 281 |
| 75 minutes cure | 288 | 150 | 258 |
| Elongation (percent): | | | |
| 35 minutes cure | 690 | 650 | 650 |
| 75 minutes cure | 640 | 530 | 620 |
| 300% Modulus (kg./cm.²): | | | |
| 35 minutes cure | 22.5 | 23.9 | 26.7 |
| 75 minutes cure | 21.1 | 28.1 | 28.2 |
| Hardness (Shore A-2): | | | |
| 35 minutes | 45 | 46 | 47 |
| 75 minutes | 44 | 48 | 48 |

Table III shows that the NIR-natural rubber blends have high gum tensile strength and elongation similar to the unblended NIR, while hardness and modulus of the blends decrease as the proportion of natural rubber is increased.

EXAMPLE 3

A blend of an isoprene-acrylonitrile copolymer and a 93% cis-1,4-polybutadiene was prepared. The copolymer contained 31% by weight of acrylonitrile and had a Mooney viscosity of (ML-4 at 100° C.) of 70, while the polybutadiene was produced in a benzene solution in the presence of $AlEt_2Cl$—$CoX_2$ catalyst and had a Mooney viscosity of (ML-4 at 100° C.) of 37. The blend was compounded and vulcanized according to the recipe and procedure shown in Example 1 and physical test data are shown in Table IV.

TABLE IV

| | |
|---|---|
| Proportion of NIR in the blend (percent by weight) | 80 |
| Tensile (kg./cm.²) 50′ cure | 167 |
| Tensile (kg./cm.²) 100′ cure | 135 |
| Elongation (percent) 50′ cure | 690 |
| Elongation (percent) 100′ cure | 690 |
| 300% Modulus (kg./cm.²) 50′ cure | 16.5 |
| 300% Modulus (kg./cm.²) 100′ cure | 15.5 |
| Hardness (Shore A-2) 50′ cure | 43 |
| Hardness (Shore A-2) 100′ cure | 42 |

Table IV shows that the non-reinforced vulcanized blend of NIR and cis-1,4-polybutadiene has satisfactory stress strain properties. The blend also showed rubber-like extensibility and flexibility at a temperature of about 0° C. which were markedly better than those of the unblended NIR copolymer compound.

EXAMPLE 4

The ability of non-reinforced vulcanized blends of isoprene acrylonitrile copolymer (NIR) and natural rubber to withstand sustained tension was determined at temperatures ranging from 54° C. to 110° C. Three blends were prepared using a NIR sample containing 31% by weight of acrylonitrile and #1 Smoked Sheets in proportions as indicated in the table below. The blends were compounded using the recipe of Example 1, press-moulded and vulcanized at 145° C. for 50 minutes. Stress-strain test rings were next cut out from the vulcanized sheets and placed over ring clamps of a tester maintained at the temperatures indicated in Table V. The rings were then stretched to 200% elongation and held until broken. The time which elapsed between stretching and breaking is noted in Table V. A control compound of the unblended NIR was also tested in the above manner and the results are included for comparison in Table V.

TABLE V

| Compound | NIR proportion in the blend, percent by weight of total polymer | Time to break at 200% strain at— | | | |
|---|---|---|---|---|---|
| | | 54° C. | 71° C. | 94° C. | 110° C. |
| | | (Minutes of sustained tension) | | | |
| Control | 100 | 30 | 5 | 1 | 0.3 |
| 1 | 80 | >30 | 10 | 1.5 | 0.5 |
| 2 | 60 | >30 | >30 | >30 | 15 |
| 3 | 40 | >30 | >30 | >30 | >30 |

Table V indicates that blends of NIR and natural rubber show an improved resistance to break under sustained tension at 200% elongation. This property is important in the production of covered rubber thread in which the rubber thread is stretched and held for a period of time at tension until it is covered with one or more layers of a textile thread. It is also important in elasticized textile fabrics containing rubber thread which, while washed and dried, are exposed to elevated temperatures and repetitively stretched. Blend containing 60% of NIR copolymer and 40% of natural rubber showed a satisfactory ability to withstand sustained tension at temperatures up to about 100° C.

EXAMPLE 5

A blend of 60 parts by weight of the isoprene acrylonitrile copolymer of Example 3 and 40 parts by weight of #1 Smoked Sheets was made on a rubber mill with two 15 x 30 cm. rolls. The blend was compounded using the following black recipe, in parts by weight.

| | |
|---|---|
| Polymer blend | 100 |
| High Abrasion Furnace (HAF) Black | 40 |
| Stearic acid | 0.5 |
| Zinc oxide | 3.0 |
| Sulfur | 1.5 |
| Benzothiazyl disulfide | 1.0 |

For comparison a control compound was prepared from #1 Smoked Sheets using the same recipe. The above compounds were tested for millability, extrudability and then physical properties of vulcanizates. The results are presented in Table VI.

TABLE VI

| Polymer Type | Blend | #1 S.S. |
|---|---|---|
| Compound Mooney Viscosity (ML-4 at 100° C.) | 55 | 40.5 |
| Mill Shrinkage (percent) | 14.6 | 35.7 |
| Extrusion (3.2 mm. die at 104° C.): | | |
| Rate (gms./15 seconds) | 18.7 | 23.7 |
| Ratio (gms./cm.) | 0.14 | 0.114 |

| Vulcanized at 145° C. | Unaged | Air aged 70 hrs. at 100° C. | Unaged | Air aged 70 hrs. at 100° C. |
|---|---|---|---|---|
| Tensile Strength: (kg./cm.²): | | | | |
| 25 min. cure | 208 | 165 | 141 | 36.6 |
| 50 min. cure | 202 | 139 | 129 | 20.4 |
| 100 min. cure | 185 | 130 | 110 | 13.4 |
| Elongation (percent): | | | | |
| 25 min. cure | 500 | 295 | 425 | 300 |
| 50 min. cure | 480 | 280 | 440 | 300 |
| 100 min. cure | 465 | 270 | 425 | 365 |
| 100% Modulus (kg./cm.²): | | | | |
| 25 min. cure | 27.8 | 47.2 | 16.1 | 9.9 |
| 50 min. cure | 29.9 | 45.7 | 14.8 | 5.6 |
| 100 min. cure | 27.8 | 39.4 | 14.1 | 4.2 |
| 300% Modulus (kg./cm.²): | | | | |
| 25 min. cure | 110 | | 77.0 | 40 |
| 50 min. cure | 115 | | 67.5 | 20.4 |
| 100 min. cure | 108 | | 59.8 | (¹) |
| Tensile Set (percent): | | | | |
| 25 min. cure | 19 | 8 | (¹) | 12 |
| 50 min. cure | 17 | 6 | (¹) | 15 |
| 100 min. cure | 14 | 6 | (¹) | 16 |
| Hardness (Shore A): | | | | |
| 25 min. cure | 59 | 65 | 47 | 40 |
| 50 min. cure | 60 | 63 | 46 | 36 |
| 100 min. cure | 59 | 65 | 45 | 29 |
| Tear Strength (kg./cm.), (Graves Test) 50 min. cure | 42.8 | | 34.0 | |

Resistance to Hydrocarbons of 50 min. cure vulcanizates

| | | | | |
|---|---|---|---|---|
| Volume increase (percent): | | | | |
| 24 hours at 25° C. in ASTM; Fuel A | 47 | | 189 | |
| 24 hours at 25° C. in ASTM; Fuel 2 | 121 | | 357 | |
| 24 hours at 100° C. in ASTM; Oil #1 | 25 | | 131 | |
| 24 hours at 100° C. in ASTM; Oil #3 | 71 | | 300 | |

¹ Not measured.

The data in Table VI indicate that the black reinforced compound of the blend has good stress-strain properties, satisfactory stability to ageing in air and an improved resistance to hydrocarbons in comparison to the corresponding compound of natural rubber.

EXAMPLE 6

A terpolymer of a mixture of 49 parts by weight of isoprene 16 parts by weight of butadiene and 35 parts by weight of acrylonitrile (IBA) having a Mooney viscosity (ML-4 at 100° C.) of 63 was blended with natural rubber in proportions indicated in Table VII compounded using the recipe of Example 1 and vulcanized for 50 minutes at 145°. The physical properties of the unaged and hot air aged compounds are shown in Table VII.

TABLE VII

| Compound | 1 | 2 | 3 |
|---|---|---|---|
| Proportion of IBA in the blend, percent by weight | 40 | 60 | 80 |
| Tensile Strength (kg./cm.²): | | | |
| Unaged | 142 | 138 | 121 |
| Aged in 5 days in air at 100° C | 148 | 152 | 139 |
| Elongation (percent): | | | |
| Unaged | 740 | 610 | 690 |
| Aged in air at 100° C | 500 | 490 | 480 |
| Modulus (kg./cm.²): | | | |
| At 300% elongation unaged | 16.5 | 14.4 | 19.0 |
| At 100% elongation air aged | 9.8 | 10.5 | 11.6 |
| Flex Life (kcy./cm.): Unaged | 100 | 100 | 31 |

The data in Table VII indicates that the blends of the isoprene-butadiene-acrylonitrile copolymer and natural rubber produce gum compounds which have good physical properties, that is, high tensile strength at high elongation and relatively low modulus, good resistance to ageing in hot air.

EXAMPLE 7

A terpolymer of a mixture of 49 parts by weight of isoprene, 16 parts of piperylene and 35 parts of acrylonitrile (IPA) having a Mooney viscosity (ML–4 at 100° C.) of 51 was blended with natural rubber, compounded using the recipe of Example 1 and vulcanized at 145° C. for 50 minutes. The composition of the blend and physical properties of vulcanizates, unaged and aged at 100° C., both in air for 5 days and in ASTM #3 oil for 1 day, are shown in Table VIII.

TABLE VIII

| | |
|---|---|
| Proportion of IPA (percent by weight of the blend) | 60 |
| Tensile Strength (kg./cm.$^2$): | |
| Unaged | 224 |
| Aged in hot oil | 52 |
| Aged in hot air | 149 |
| Elongation (percent): | |
| Unaged | 680 |
| Aged in hot oil | 550 |
| Aged in hot air | 500 |
| Modulus (kg./cm.$^2$): | |
| At 300% elongation (unaged) | 15.5 |
| At 100% elongation (hot air aged) | 10.5 |

EXAMPLE 8

A terpolymer of a mixture of 55 parts by weight of isoprene, 35 parts by weight of acrylonitrile and 10 parts by weight of styrene (IAS) having a Mooney viscosity (ML–4 at 100° C.) of 64 was blended with natural rubber in a ratio by weight of 80/20 and 60/40. The blends were then compounded using the recipe of Example 1, press-moulded to a sheet of 1.0 mm. thickness and vulcanized at 145° C. for 50 minutes. Stress-strain properties were measured in an Instron tensile tester using dumbbell samples cut out from the unaged sheet. Similar measurements were also made on samples that had been aged at 100° C. in ASTM #3 oil for 1 day and in hot air for 5 days. The results are presented in Table IX.

TABLE IX

| Compound | 1 | 2 |
|---|---|---|
| Proportion of IAS in the blend (percent by wt.) | 60 | 80 |
| Tensile Strength (kg./cm.$^2$): | | |
| Unaged | 181 | 207 |
| Aged in hot oil | 41 | 70 |
| Aged in hot air 5 days | 186 | 121 |
| Elongation (percent): | | |
| Unaged | 550 | 660 |
| Hot oil aged | 510 | 590 |
| Hot air aged | 470 | 420 |
| 300% Modulus (kg./cm.$^2$): | | |
| Unaged | 20.8 | 16.5 |
| Hot oil aged | 11.6 | 14.4 |
| Hardness (Shore A–2): Unaged | 41 | 38 |

Compounds 1 and 2 of Table IX showed good physical properties, resistance to hot air ageing and satisfactory oil resistance.

I claim:

1. Elastic shaped articles of filamentary material comprising a vulcanized rubber composition comprising (a) a blend of a minor proportion of natural rubber with a major proportion of a copolymer of a mixture of monomers comprising isoprene and a nitrile of an acrylic acid and (b) from 5 to 20 parts per 100 parts by weight of the polymer blend of a non-reinforcing filler, said composition being free of reinforcing filler.

2. Shaped articles according to claim 1, wherein the copolymer is a copolymer of isoprene and acrylonitrile.

3. Shaped articles according to claim 1, wherein the blend comprises about 10 to 40 weight percent of natural rubber and about 90 to 60 weight percent of a copolymer of isoprene and acrylonitrile containing between 20 and 50 mole percent of acrylonitrile.

References Cited
UNITED STATES PATENTS

| | | | |
|---|---|---|---|
| 2,657,190 | 10/1953 | Banes et al. | 260—894 |
| 2,638,460 | 5/1953 | Crouch | 260—41.5 |
| 2,785,143 | 3/1957 | Edgerley | 260—41.5 |

ALLAN LIEBERMAN, *Primary Examiner.*

S. L. FOX, *Assistant Examiner.*